Oct. 10, 1967  L. L. VANT-HULL ETAL  3,346,826
APPARATUS FOR EXCLUDING MAGNETIC FIELDS
Filed Nov. 9, 1964                                           2 Sheets-Sheet 1

INVENTORS,
LORIN L. VANT-HULL
JAMES E. MERCEREAU

BY *Samuel Lindenberg*
*Arthur Frelich*
ATTORNEYS

Oct. 10, 1967     L. L. VANT-HULL ETAL     3,346,826
APPARATUS FOR EXCLUDING MAGNETIC FIELDS
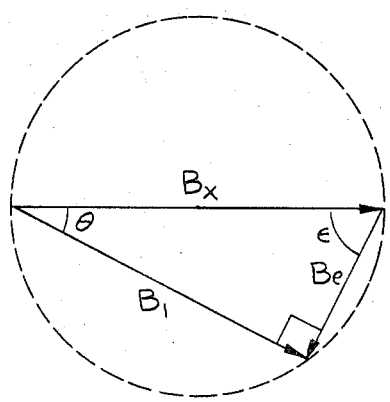
*Fig. 3*
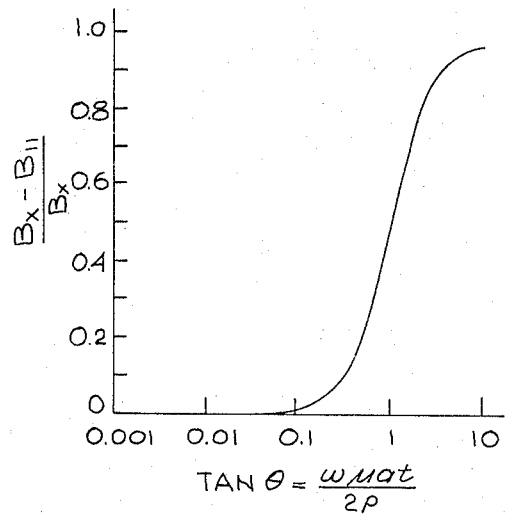
$TAN\ \theta = \dfrac{\omega\mu at}{2\rho}$
*Fig. 4*
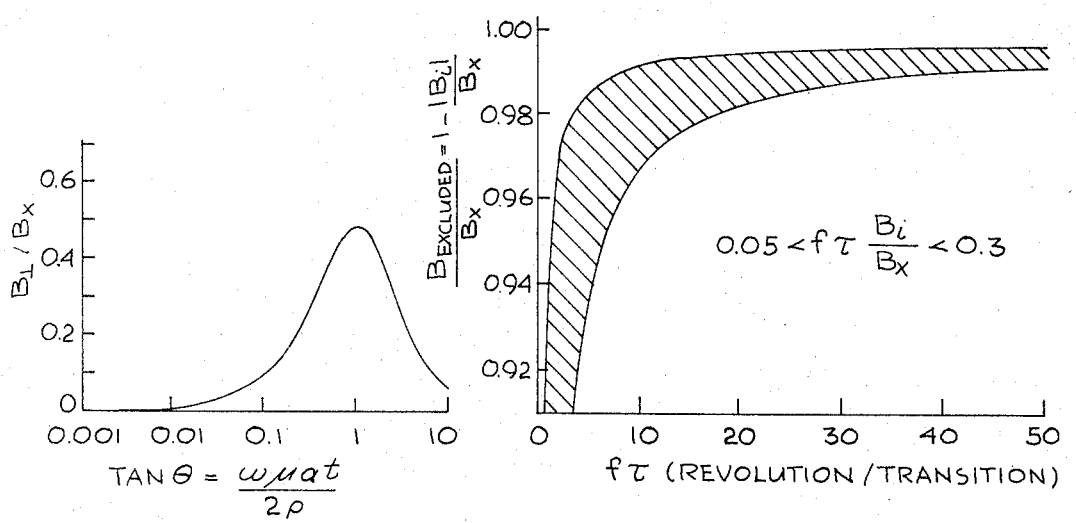
*Fig. 5*          *Fig. 6*
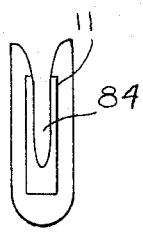
*Fig. 7*
INVENTORS,
LORIN L. VANT-HULL
JAMES E. MERCEREAU
BY *Samuel Lindenberg*
*Arthur Freilich*
ATTORNEYS United States Patent Office 3,346,826
Patented Oct. 10, 1967

3,346,826
APPARATUS FOR EXCLUDING MAGNETIC FIELDS
Lorin L. Vant-Hull, Pasadena, Calif., and James E. Mercereau, Dearborn, Mich., assignors to California Institute Research Foundation, Pasadena, Calif., a corporation of California
Filed Nov. 9, 1964, Ser. No. 409,835
9 Claims. (Cl. 335—216)

ABSTRACT OF THE DISCLOSURE

Apparatus for creating and maintaining an extremely low magnetic field region. The apparatus includes a conductive body substantially enveloping the region from which the magnetic field is to be excluded. Means are provided for rotating the conductive body relative to the field to thus induce eddy currents therein. The conductive body is then cooled to a superconducting state to maintain the eddy currents and thus exclude the magnetic field after rotation has stopped.

This invention relates to an apparatus for creating and maintaining an extremely low magnetic field region.

The motion of a conductor in a steady magnetic field induces eddy currents which tend to reduce the field change seen by the conductor. Within a hollow cylinder rotating about its axis, this behavior tends to reduce the magnitude and to change the direction of the component of field perpendicular to the axis in a manner functionally dependent on the ratio of rotation rate to resistivity. In accordance with the present invention, this characteristic is utilized to establish a region of low magnetic field in the interior of a hollow rotating cylinder. If the cylinder is subsequently cooled to the super-conducting state, rotation may be stopped and the low field region will be maintained by the super currents. Further changes in all components of the external field are then shielded from the interior of the super-conducting cylinder in a predictable manner.

In a preferred embodiment of the invention, in order to obtain a region of low horizontal magnetic fields, a hollow tin cylinder is provided which is rotated about its vertical axis while undergoing a super-conducting transition. Both the vertical and horizontal fields within the cylinder are measurable through the use of a specially designed holder which allows a Hall probe to be rotated about both a vertical and a horizontal axis while in liquid helium.

The novel features that are considered characteristic of this invention are set forth with particularity in the appended claims. The invention itself both as to its organization and mode of operation, as well as additional objects and advantages thereof, will best be understood from the following description when read in connection with the accompanying drawings, in which:

FIGURE 3 is a vector diagram illustrating the rotation and attenuation of a field within a rotating cylinder;

FIGURE 4 is a graph illustrating the fractional reduction of the field components parallel to an applied field by a rotating cylinder;

FIGURE 5 is a graph illustrating the behavior of the field component perpendicular to both the applied field and the cylinder axis, within a rotating cylinder;

FIGURE 6 is a graph illustrating the fraction of magnetic field expelled from the interior of a hollow cylinder in accordance with the invention;

FIGURE 7 is a schematic diagram of an alternate arrangement of the apparatus of FIGURE 1.

Figure 1:
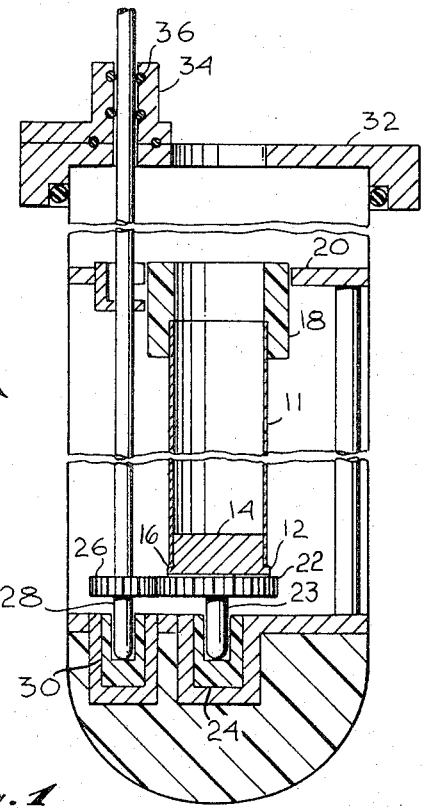
FIGURE 1 is a vertical sectional view of a preferred embodiment of an apparatus constructed in accordance with the present invention.

Attention is now called to FIGURE 1 which illustrates a glass helium Dewar 10 in which is received an open cylinder 11 formed of a metal, such as tin, capable of being cooled into a super-conducting state. Regardless of how the cylinder 11 is fabricated, care should be taken to assure that the surfaces of the cylinder are smooth. Thus, if a seam is required, the edges adacent thereto should be carefully mated. The lower extremity of the cylinder 11 is closed by a plug 12 having a reduced portion 14 projecting into the cylinder and a shoulder 16 engaged against the end of the cylinder. A hollow cylindrical sleeve 18 having an enlarged internal portion is fitted around the upper end of the cylinder 11. The outer surface of the sleeve 18 is rotatable in an opening in a bearing plate 20 secured in the Dewar 10. The plug 12 is adhered to a gear 22 which has a stem 23 secured thereto and rotatable in a bearing 24. The gear 22 is drivingly engaged with a gear 26 secured to drive shaft 28 rotatable in bearing 30. Drive shaft 28 extends through openings in the plate 20 and Dewar cap 32. The drive shaft 28 projects through and is rotatable in a bearing 34, containing an O-ring vacuum seal 36, secured to the upper surface of the cap 32. A variable speed drive motor (not shown) is coupled to the drive shaft 28.

Although the dimensions of the cylinder 11 are not critical, an experimental apparatus employed a cylinder 20 cm. long and 2.4 cm. in diameter. The experimental cylinder was formed by rolling a sheet of tin 0.1 cm. thick. The plate 20 is preferably formed of brass and the sleeve 18 of Teflon with the Teflon being oversized by 1.5% at room temperature to compensate for thermal contraction and permit smooth operation at liquid helium temperatures. Other bearing surfaces are formed of similar materials and are similarly dimensioned. The sleeve 18 is made sufficiently long so that any localized heating resulting from rotation at its bearing surface is isolated from the cylinder 11.

In order to measure the magnetic field intensity within the cylinder 11, a Hall probe can be used. In order to balance out the resistive zero-field component of the Hall probe voltage and hence determine the zero of magnetic field, it is convenient to rotate the probe to obtain positive and negative field readings. In order to measure each component of the residual fields, it is desirable to be able to mount a Hall probe within the cylinder 11 and selectively move it to various positions. In order to do this, a support apparatus 48, shown in FIGURE 2, is provided.

Figure 2:
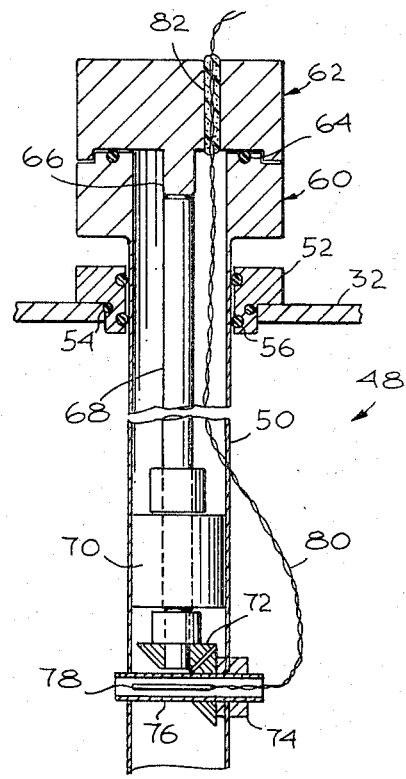
FIGURE 2 is a vertical sectional view illustrating an apparatus adapted to be utilized with the apparatus of FIGURE 1 for supporting a Hall probe therein.

The apparatus 48 of FIGURE 2 includes a hollow tube 50 which projects through a bearing assembly 52. The bearing assembly 52 is secured in a central opening in the Dewar cap 32 above the cylinder 11. An O-ring 54 received between the assembly 52 and the cap 32 provides a vacuum seal therebetween. The bearing assembly 52 is provided with a central opening through which the tube 50 projects. O-ring vacuum seals 56 are positioned in the central opening in the bearing assembly 52 around the tube 50. The tube 50 can thus move vertically relative to the bearing assembly 52 and can rotate therein. The O-rings 56 however assure a vacuum seal between the bearing assembly 52 and the tube 50.

The upper end of the tube 50 is secured to a lower knob 60. An upper knob 62 is supported on the lower knob with an O-ring 64 disposed therebetween to permit relative rotation. The upper knob 62 has a central spindle depending therefrom which is coupled to a tube 68 which projects through a central opening in a bushing 70 secured in the tube 50. A bevel gear 72 is terminally secured to the tube 68.

A bevel gear 74 is engaged with the bevel gear 72 and is mounted for rotation about an axis perpendicular to the tube 50. An axle 76 is supported within the bevel gear 74 and a Hall probe 78 is retained in the axle. Leads 80 project from the Hall probe 78 through the tube 50 and through an opening 82 in the upper knob 62.

Figure 8:
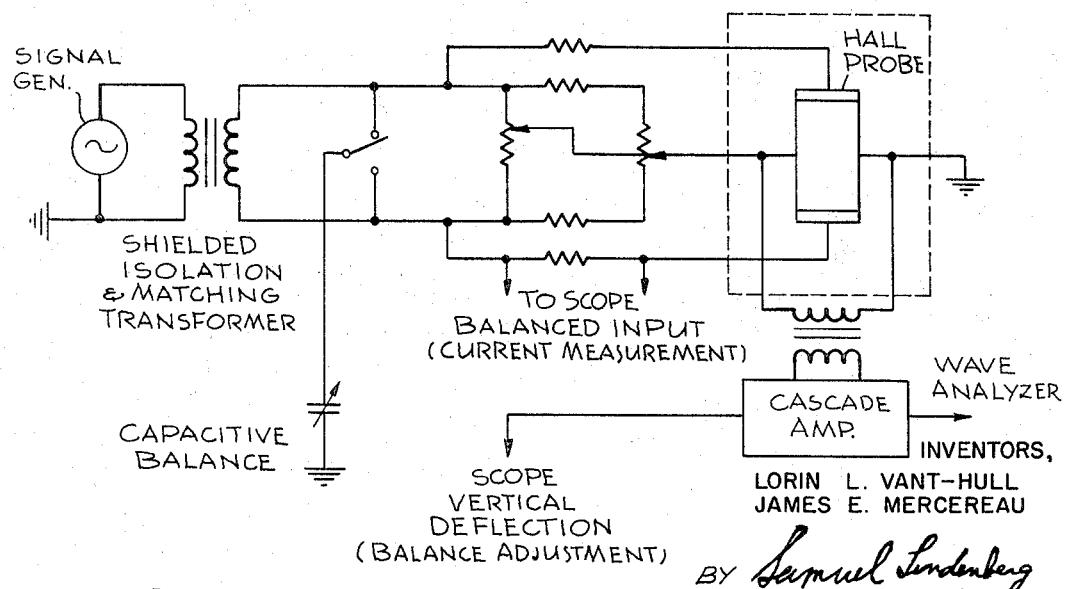
FIGURE 8 is a schematic diagram of a circuit adapted to be employed with the probe of FIGURE 2.

The assembly of FIGURE 2 permits the Hall probe to be oriented in any direction. More particularly, simultaneous rotation of the knobs 60 and 62 rotate the probe 78 about the assembly axis. Differential rotation of the knob 62 relative to the knob 60 allows orientation of the probe about its horizontal axis. Thus, with the current axis of the Hall probe horizontal, it can be oriented so that its effective plane is aligned to face upwardly, horizontally, or downwardly by rotating the central tube 68. By additionally rotating both knobs simultaneously, the probe can be oriented in any direction. Care of course should be taken to avoid flexing the leads 80 to any great extent. The leads 80 can be connected to an alternating current circuit for driving the Hall probe as shown in FIGURE 8.

Since the creation of very low magnitude magnetic fields are desired within the cylinder 11, it is necessary to use great care in the selection of materials. Thus, many samples of brass are found to have significant magnetic moments, resulting presumably from ferromagnetic inclusions. Also, miniature shielded cable is often constructed of wire which is ferromagnetic. In view of this, each element of the structures of FIGURES 1 and 2 should be carefully chosen if a sufficiently low magnetic field is to be achieved.

The theory as to why a very low magnitude magnetic field is created within the cylinder 11 involves, of course, a consideration of eddy currents. More particularly, the rotation of the hollow cylinder in a magnetic field induces eddy currents which tend to shield the region inside the cylinder from the non-axial component of the magnetic field.

Since the axial component of field is not altered by rotation of the cylinder, it is convenient to reduce the discussion to two dimensions, i.e., to the $x$–$y$ plane (which is normal to the cylinder axis). The internal field vector $B_i$, in this plane, is reduced in magnitude and rotated from the direction of the external field ($B_0=B_0x$) as $$B_i = \hat{x} B_0 \cos 2\theta + \hat{y} B_0 \cos \theta \sin \theta \quad (1)$$

$$|B_i| = B_0 \cos \theta \quad (2)$$

The angle of rotation in the $x$–$y$ plane, $\theta$, is $$\theta = \tan^{-1}(\omega\mu\, at/2p)$$

where $\omega=2\pi f$=angular rotation rate, $\mu$ is the absolute permeability of the metal, $a$ the mean radius of the cylindrical shell, $t$ the thickness of the cylindrical shell, $p$ the resistivity, and $(\omega\mu/2p)^{-1/2}$ the usual frequency-dependent skin depth. From Equation 2, it is interesting to note (see FIGURE 3) that if the magnitude of the external normal component $B_x$ is represented by the diameter of a circle, the internal field $B_i$ may be represented by a vector with the same origin and ending on the same circle, but rotated by an angle $\theta$. In this figure, $B_e$ represents the magnetic field generated by the eddy currents which, by Lenz's law, act to oppose the ambient field. The theoretically obtained relationships for the internal fields in the $x$–$y$ plane (parallel and perpendicular to $B_0$) are plotted in FIGURES 4 and 5 against log ($\tan \theta$).

The relationships illustrated in FIGURES 4 and 5 were verified experimentally above the transition temperature up to $\omega=\pm40\pi$ rad./sec (which corresponds to $\tan \theta \cong 1.3$ or $\theta \cong \cong 52°$ for the cylinder used).

Experiments with apparatus having the dimensions aforeindicated, indicate that above the super-conducting transition temperature, the magnetic field $B_x$ is only slightly excluded by eddy current effects for reasonable rotation rates ($f=1$–$10$ r.p.s.). The essentially complete magnetic field exclusion is experimentally observed for a cylinder cooled through the super-conducting transition while rotating ($B_i/B_x \cong 0.01$ for $=2$ r.p.s.) corresponds to $\tan \theta$ reaching 500 times the value observed just above $T_c$. For constant rotation rate this occurs when $p \cong 0.002 p_0$, i.e., well into the super-conducting transition. It was, in fact, observed that, upon reducing the temperature while rotating the cylinder slowly, the internal magnetic field was not significantly attenuated until the critical temperature for the onset of super-conductivity was reached. Then, in a temperature range of about $10^{-2}°$ K., the internal field rapidly fell to its final value.

It was found experimentally that the residual field inside the cylinder after this transition was a function of ambient field $B_0$, rotation rate $f$, and the time required to reduce the temperature through the super-conducting transition $\tau$. FIGURE 6 illustrates the area encompassing most experimentally derived points which for an applied field $B_x$ obey the inequality $$0.05 < f\tau B_i/B_x < 0.3$$

For dimensions other than the exemplary dimensions recited, the "$f$" term of FIGURE 6 should be multiplied by a scaling factor $$\frac{at\sigma_0}{1.8 \times 10^3 \text{ ohm m}^3}$$

As the temperature of the cylinder falls below the critical temperature, the eddy current shielding, which was about 2% effective in reducing the internal magnetic field above $T_c$, rapidly increases to 99% or more effectiveness as the resistivity of the tin decreases. Eventually, a point is reached when some closed loop of tin becomes superconducting, trapping any magnetic flux still passing through its surface. If the transition rate is sufficiently slow, so that the cylinder turns several revolutions while this loop is very near the critical temperature, the distorted magnetic field can lower the critical temperature sufficiently at a point on the perimeter that the field tends to diffuse out. Thus, the ultimate field trapped in the cylinder decreases as the time for diffusion $\tau$ increases.

Once the cylinder has become super-conducting and a trapped field (or field-free region) is established, it is of interest to know how the internal field is affected by externally applied fields less than the critical. On the cylinder axis it was found that subcritical magnetic fields applied perpendicular to the axis were attenuated with distance from the end by approximately a factor of 30/diameter, while axial fields were attenuated by a factor of about 1000/diameter. Thus a high degree of shielding of either alternating or steady fields is possible. For a cylinder with an 8/1 aspect ratio, a shielding of external fields by about $10^6$ is attainable.

The field difference which can be sustained by such a "solenoid" at a temperature T (below the critical temperature $T_c$) is limited by geometry effects and free energy considerations to a field considerably less than the bulk critical field for the super-conductor. Thus, it may be advisable to shape the lips of the cylinder as indicated by Hildebrandt et al. in the Journal of Applied Physics, 33, 1798 (1962), to prevent flux jumping if field differences greater than a few gauss are to be maintained.

A novel technique for measuring bulk resistivities over a wide range of values is suggested by these results. If the rotation-induced change in the appropriate component of the field inside the cylinder is measured, the value of $p=\omega\mu at/2$ tan $\theta$ may be determined with considerable accuracy over a range of $0.01 < \tan \theta < 100$. By suitable selection of the cylinder dimensions and rotation rates, values of $p$ from $10^{-5}$ down to $10^{-14} \Omega$-m. may be determined. This allows measurement of the resistivity of any reasonably pure metal at room temperature. Furthermore, resistivity vs temperature measurements may be made for all these metals and others down to helium temperature. In fact, the resistivity of most super-conductors can be followed at least 3 decades into the super-conducting transition.

In many cases the ability to measure resistivities on truly bulk samples without the need for making contacts to the sample, without having to pass large currents through the sample, and without having to measure minute voltages may far outweigh the obvious difficulties inherent in the application of this method.

Attention is now called to FIGURE 7 which illustrates a schematic diagram of an alternate embodiment of the rotating cylinder assembly of FIGURE 1. The assembly of FIGURE 7 utilizes a Dewar which has a portion projecting into the cylinder 11. Thus, a zero magnetic field at room temperature is created in the region 84 within the cylinder and outside the Dewar.

From the foregoing, it should be appreciated that an apparatus has been provided herein for creating very low magnitude magnetic fields by rotating a hollow cylinder as it passes through the super-conducting transition. (It should be noted that the axial component of the magnetic field is of course not affected.) Starting in a readily attainable $10^{-4}$ G field, the non-axial component of the final trapped field can easily be $10^{-6}$ G or less. Once super-conducting, such a cylinder is self-compensating and acts as an effective shield against changes in the external magnetic field so long as the critical field is nowhere exceeded.

The self-compensating nature of the supper-currents may outweigh the difficulties attendant to the low temperature techniques in some applications. Once a low field region or a region of known axial field has been established, it can easily be made a portable environment which will maintain itself constant indefinitely. Although the discussion herein has been restricted to rotating a conductor in a stationary magnetic field, presumably the earth's field, in order to exclude the magnetic field from within the conductor, it should be apparent that all that is really ncessary is a relatively changing magnetic field. Thus, a magnetic field rotating about a stationary cylinder can be excluded from within the cylinder by a means and apparatus similar to that detailed herein.

What is claimed is:

1. Apparatus for creating and maintaining a very low magnitude magnetic field in a small region within a larger magnitude magnetic field region, said apparatus comprising a conductive body enveloping said small region; means for rotating said conductive body relative to said larger magnitude magnetic field to induce eddy currents therein tending to exclude at least a portion of said larger magnitude magnetic field from said small region; and means for cooling said conducting body to a super-conducting state to thereby produce self-maintaining super currents therein.

2. Apparatus for excluding any non-axial magnetic field components from a relatively small region within a larger magnetic fiield region comprising a hollow conductive cylinder having an axis; means mounting said cylinder with its axis extending parallel to the axis of said smaller region; means for rotating said cylinder about its axis; and means for cooling said cylinder to a super-conducting state.

3. The apparatus of claim 2 wherein said means for cooling said cylinder includes a Dewar flask; and means mounting said cylinder for rotation within said Dewar flask.

4. Apparatus for remotely orienting a probe within a vacuum sealed container comprising a hollow tube having first and second ends; an opening in said container; means supporting said hollow tube in said opening for rotation about its own axis with the second end thereof projecting into said container; probe mounting means mounted adjacent said hollow tube second end for rotational movement about its own axis extending perpendicular to said hollow tube; and means for selectively rotating said hollow tube about its axis and said probe mounting means about its axis.

5. The apparatus of claim 4 including a shaft having an axis and first and second ends; means mounting said shaft for rotational movement about its axis within said hollow tube; and wherein said means for rotating said probe mounting means includes a first gear fixed to said probe mounting means and a second gear, engaged with said first gear fixed to said shaft.

6. The apparatus of claim 5 including relatively movable first and second knobs respectively fived to said first ends of said hollow tube and said shaft.

7. The apparatus of claim 2 wherein said means for cooling operates to cool said cylinder from a normal to a super-conducting state during a finite time period and wherein said means for rotating continues to rotate said smaller region; means for rotating said cylinder time period.

8. Apparatus for excluding any non-axial magnetic field components from a relatively small region within a larger magnetic field region comprising a hollow conductive cylinder having an axis; means mounting said cylinder with its axis extending parallel to the axis of said smaller region; means for rotating said cylinder about its axis; means for cooling said cylinder to a superconducting state at a sufficiently slow rate to permit said cylinder to be rotated through at least several rotations during the transition from a normal to a super-conducting state.

9. Apparatus for creating and maintaining a very low magnitude magnetic field in a small region with a larger magnitude magnetic field region, said apparatus comprising a conductive body enveloping said small region; means for rotating said conductive body relative to said larger magnitude magnetic field to induce eddy currents therein tending to exclude at least a portion of said larger magnitude magnetic field from said small region; and means for cooling said conductive body from a normal to a super-conducting state at a sufficiently slow rate to permit several relative rotations between said conductive body and said larger magnitude magnetic field during the transition.

References Cited

UNITED STATES PATENTS

| | | | |
|---|---|---|---|
| 3,234,435 | 2/1966 | Hempstead et al. | 335—216 |
| 3,234,458 | 2/1966 | Bean et al. | 324—40 |

BERNARD A. GILHEANY, *Primary Examiner.*

G. HARRIS, JR., *Assistant Examiner.*